Feb. 18, 1964   L. F. LEMM ETAL   3,121,857
METHOD AND APPARATUS FOR AIRCRAFT CONTROL
OF AIRPORT LANDING LIGHTS
Filed March 12, 1959
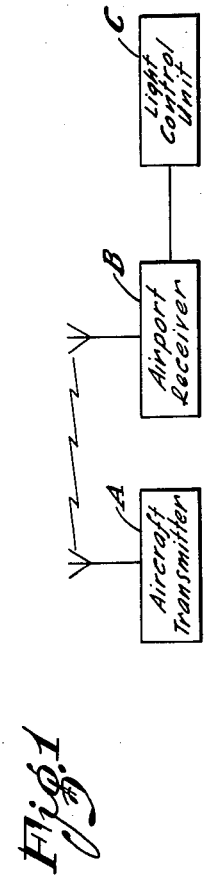
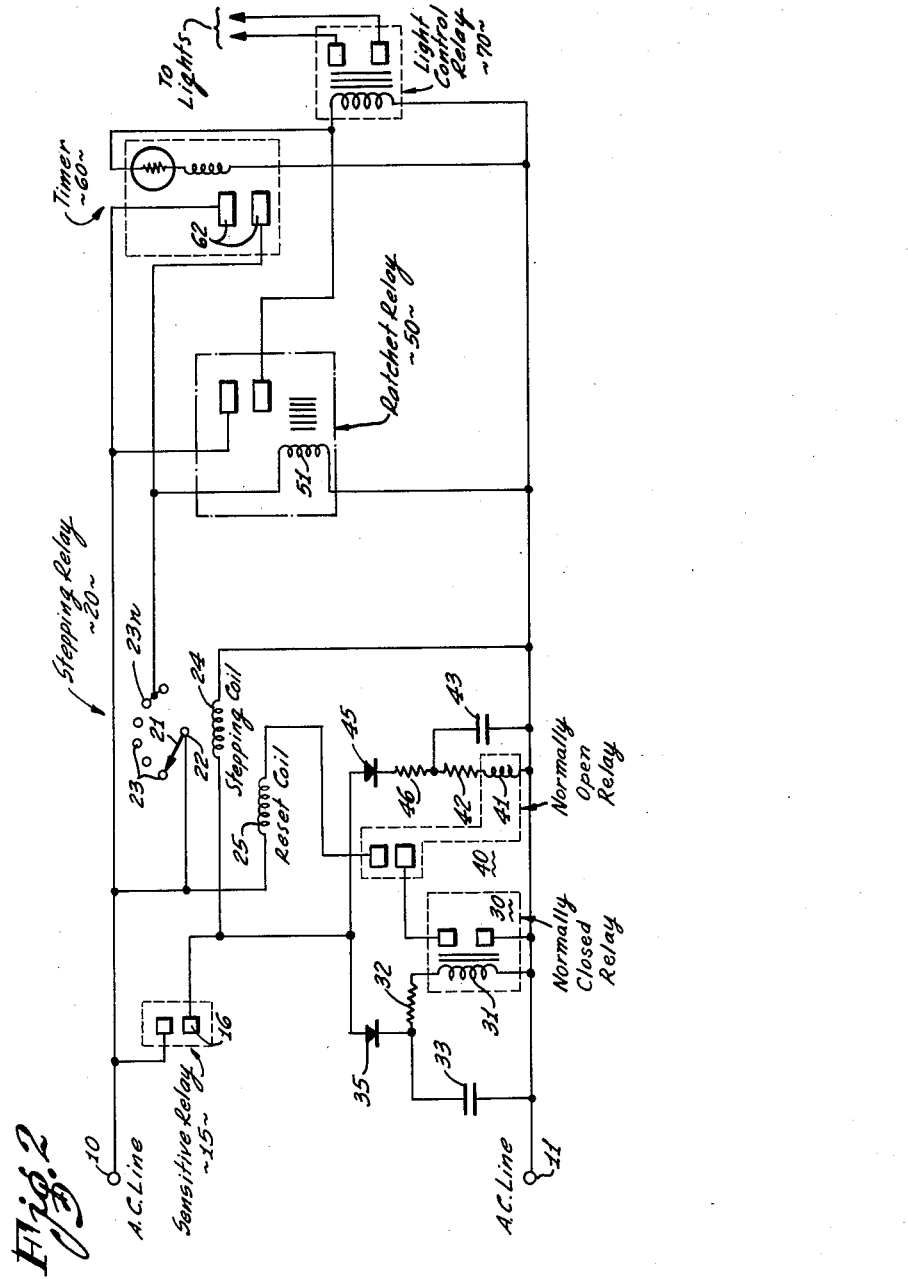
INVENTORS:
Lester F. Lemm
Harry W. Beeson
BY
Gene W. Arant
Attorney,

United States Patent Office 3,121,857
Patented Feb. 18, 1964

3,121,857
METHOD AND APPARATUS FOR AIRCRAFT CONTROL OF AIRPORT LANDING LIGHTS
Lester F. Lemm, Westminster, and Harry W. Beeson, Fullerton, Calif., assignors of one-third each to John E. McCroy, John I. Adams, and Truman Baker
Filed Mar. 12, 1959, Ser. No. 798,978
2 Claims. (Cl. 340—25)

The present invention relates to a method and apparatus by which the landing lights of an airport may be turned on under control of the pilot of an aircraft which is about to make a night landing.

Many small airports are used only occasionally and hence are manned by operators only during certain restricted hours. If an operator were to be maintained on duty throughout the night the cost of his wages would prohibitively increase the operating expenses of the airport.

Two different arrangements are widely used by small airports which are unmanned during the night. According to one arrangement the landing lights are permitted to burn continuously during the night so that any craft which seeks to land may do so. Modern landing lights have been developed which have a very high degree of visibility during fog and similar atmospheric conditions. Such lights require a large amount of electricity for their operation, however, hence the small airport which keeps its landing lights burning during the night must incur a very substantial expensive for that purpose.

The other arrangement used by unmanned airports is to keep the landing lights turned off, and to utilize the services of a policeman, night watchman or other available person for turning them on when and as needed. According to this arrangement the aircraft is required to "buzz" the field in order to indicate a desire to land. The lights are then turned on by the policeman, night watchman or other responsible person, although it may be necessary for him to drive several miles by automobile in order to reach the airport. The limitations of such an arrangement are readily apparent.

According to the present invention a method and apparatus are provided which permit the landing lights to be turned on under the control of the pilot who is about to land. A predetermined set of signals is transmitted from the aircraft in a predetermined frequency channel. A radio receiver and a light control unit are provided at the airport, the receiver being tuned to the predetermined transmission frequency and being energized in a receptive condition at all times. The light control unit is coupled to the receiver and is adapted to respond to the predetermined set of signals for turning on the landing lights.

In carrying out the method of the present invention the radio transmitter in the aircraft cannot feasibly be directionalized, hence the problem arises that where two or more airports are located in the same vicinity there must be some means of selecting the particular one at which the pilot wishes to land. In accordance with the invention, therefore, a code is provided such that a different identification is assigned to each airport in a particular geographical area. In transmitting the command for the lights to be turned on the pilot selects the code identification for the particular airport at which he wishes to land.

An object of the invention, therefore, is to provide a method and apparatus for turning on the landing lights of an airport under the control of the pilot of an aircraft which is about to make a night landing.

Another object of the invention is to provide a method and apparatus whereby the pilot of an aircraft about to make a night landing may select a particular landing field, and may cause its landing lights to be turned on.

A further object of the invention is to reduce the maintenance expense of airports by providing automatic means for turning the landing lights on and off at night, thus making it unnecessary for the airport to be manned during the night.

An additional object of the invention is to provide a light control apparatus which may be installed in an airport and utilized in conjunction with conventional radio communication equipment for turning on landing lights when an aircraft approaches for a night landing.

The present invention relates to a modified form of the method and apparatus which are described and claimed in our co-pending application Serial No. 770,062, filed October 28, 1958.

The above and other objects of the invention will be more readily understood from the following description in conjunction with the accompanying drawing in which:

FIGURE 1 illustrates in block form the radio communication system which is utilized to carry out the novel method of the invention; and FIGURE 2 illustrates schematically a light control unit which is suitable for use in the system of FIGURE 1.

Referring now to the drawing it will be seen from FIGURE 1 that signals transmitted by a transmitter A on the aircraft are received by a radio receiver B at the landing field from whence they are fed to the light control unit C. Transmitter A may be a conventional voice transmitter which is adapted to operate on any of several selected frequencies. Transmitter A is preferably equipped with a crystal, or it may be equipped with a number of crystals and an appropriate selector switch. Receiver B is tuned to single fixed frequency which is preferably in the VHF range and may, for example, be 122.8 mc. Tuning of the receiver is preferably maintained by a crystal.

In accordance with the invention the pilot of the aircraft may turn on the landing lights simply by setting the selector switch to the predetermined transmission frequency (such as 122.8 mc.), and then pressing his microphone button the appropriate number of times. Each time the microphone button is pressed the transmitter is turned on and generates a carrier wave at the fixed frequency to which the receiver is tuned. It is then necessary at the receiver to detect only the beginning of each reception of the carrier wave.

In other words, each time the pilot depresses his microphone button the carrier wave is turned on until he releases the button. For the purposes of the present invention it is largely immaterial how long the carrier is turned on since there is no necessity for distinguishing between "dots" and "dashes." It is also largely immaterial as to the magnitude or strength of the carrier wave which is received at the landing field, so long as it exceeds the necessary minimum for reliable communication.

Circuit means are provided in the receiver, in conjunction with the automatic volume control, for briefly closing a pair of relay contacts each time the reception of the carrier wave is initiated. Circuit details suitable for this purpose are described in our above referred to co-pending application.

Referring now to FIGURE 2 in which the light control unit C is schematically illustrated, it will be seen that operating current is provided from a conventional A.C. power source to a pair of mains 10, 11. A sensitive relay 15 provided in the light control unit is selectively closed by the receiver, in the manner previously indicated, for passing a control pulse to various circuit portions of the light control unit.

A mechanical stepping relay 20 is provided with a movable arm 21, a fixed contact 22 for the movable arm, and a plurality of sequentially engageable contacts 23. A stepping coil 24 responds to each applied control pulse for advancing the movable arm to the next succeeding one of the contacts 23, while a reset coil 25 may be energized for resetting the movable arm to its initial position, in engagement with the first one of the contacts 23. A particular contact 23n represents a predetermined count position which, when reached by the stepping relay, is intended to result in the turning on of the airport lights.

Reset coil 25 is connected across the power mains 10, 11, but is normally not energized by virtue of the series interposition of the contacts of a normally closed relay 30 and a normally open relay 40. Actuating coil 31 of relay 30 has one end connected to power main 11 and its other end connected through a resistor 32 to a capacitor 33 which is in turn connected to the main 11, thus providing a series-loop circuit. A diode 35 has its cathode connected to the juncture of resistor 32 and capacitor 33, while its anode is connected to operating contact 16 of relay 15.

Relay 40 has an actuating coil 41, one end of which is connected to power main 11 while its other end is connected through a resistor 42 to a capacitor 43 which is also connected to power main 11, thus providing a second series-loop circuit. A second diode 45 has its cathode connected through a resistor 46 to the juncture of resistor 42 and capacitor 43, while the anode of diode 45 is connected to operating contact 16 of relay 15.

The operation of relays 30 and 40 together with their associated circuitry is as follows. The closing of relay 15 permits alternating current to flow through diodes 35 and 45, resulting in rectification of the current and the consequent storing of a positive charge on capacitors 33, 43. At the same time, a rectified current flows through the actuating coils 31, 41 with the result that the contacts of normally closed relay 30 assume an open position while the contacts of normally open relay 40 assume a closed position. When relay 15 opens, the capacitors 33, 43 provide a continued flow of actuating current to their respectively associated actuating coils, thus maintaining both relays in their operating, as distinguished from their normal, positions. The circuit of actuating coil 31 has a relatively short time constant and the charge on capacitor 33 is drained off rather rapidly, with the result that relay 30 returns to its normally closed position approximately one second after relay 15 opens. The circuit of actuating coil 41 has a much longer time constant, hence relay 40 remains closed until after the relay 30 closes.

Thus, approximately one second after relay 15 opens, both of relays 30 and 40 are closed. The result is that current flows through reset coil 25, thus resetting stepping relay 20 to its initial position.

If a second pulse signal is received by radio receiver B within one second after reception of the first pulse signal, then relay 15 is closed in less than a second after it opened. Current flowing through relay 15 then recharges capacitors 33, 43. Stepping relay 20 continues to count the pulse signals received by the receiver, so long as each pulse signal occurs within one second after the occurrence of the preceding pulse signal. But if an interval of more than one second transpires without the reception of a pulse signal, stepping relay 20 is automatically reset to its initial position.

The remaining operating devices included in the light control unit are a ratchet relay 50, a timer 60, and a light control relay 70. Fixed terminal 22 of relay 20 is connected to power main 10, while terminal 23n is connected via an operating coil 51 of ratchet relay 50 to power main 11. Whenever relay 20 reaches its nth or desired count state current flows through coil 51 and actuates the ratchet relay. The ratchet relay, in turn, controls relay 70 for turning on the airport landing lights, and at the same time initiates the timing cycle of timer 60.

When timer 60 has completed its timing cycle a pair of contacts 62 which are provided thereon close with the result that ratchet relay 50 returns to its alternate position. Voltage is then removed from timer 60, which automatically resets to the beginning of its cycle. An advantage of the ratchet relay is that, after the application of an electrical current pulse to winding 51 has caused the contacts to change from their then existing position to their alternate position, the contacts are mechanically retained in their new position.

Although our invention is fully capable of achieving the results and providing the advantages hereinbefore mentioned, it is to be understood that it is merely the presently preferred embodiment thereof, and that we do not mean to be limited to the details of construction above described other than as defined in the appended claims.

We claim:

1. In a radio-controlled system for turning on the landing lights of an airport in response to the reception of a series of pulse signals having a predetermined frequency, and including means for generating a control pulse of a predetermined polarity in response to the reception of each pulse signal, the combination comprising: a stepping relay; means for actuating said relay in response to each of said control pulses; means for turning on the landing lights when said relay reaches a predetermined count condition; and means for resetting said relay to its initial state when a predetermined time period has transpired after the reception of a pulse signal without another pulse signal being received, said resetting means including a reset coil, a normally open relay having an actuating coil, a normally closed relay having an actuating coil, means connecting said last two relays in series with each other and with said reset coil for energizing said reset coil whenever both of said relays are closed at the same time, a first capacitor coupled to the actuating coil of said normally closed relay to provide a first series-loop circuit having a first time constant, a second capacitor coupled to the actuating coil of said normally open relay to provide a second series-loop circuit having a second time constant, said second time constant being substantially greater than said first time constant, first and second diodes connected to said first and second series-loop circuits, respectively, in such manner that energy passing through either diode increases the charge on the associated capacitor while concurrently energizing the associated actuating coil, and means for applying the control pulses to both of said diodes concurrently with the application thereof to said stepping relay; the circuit operation being such that after the reception of a control pulse and said predetermined time period transpires without another control pulse being received, the depletion of charge on said first capacitor causes said normally closed relay to return to its closed position while said normally open relay is still being held in its closed position.

2. In a radio-controlled system for turning on the landing lights of an airport in response to the reception of a series of pulse signals having a predetermined frequency, and including means for generating a control pulse of a predetermined polarity in response to the reception of each pulse signal, the combination comprising a stepping relay, means for actuating said relay in response to each of said control pulses, means for turning on the landing lights when said relay reaches a predetermined count condition, and means operable for resetting said relay to its initial state when a predetermined time period has transpired after the reception of a pulse signal without another pulse signal being received; said last-named means including a normally open relay and a normally closed relay, a reset coil for said stepping relay connected in series with both of said relays, means for actuating both of said relays simultaneously in response to each control pulse, means for maintaining said normally closed relay in its open condition for only said predetermined time period after the reception of a control pulse, and means for maintaining said normally open relay in its closed condition for more than said predetermined time period after the reception of a control pulse.

References Cited in the file of this patent

UNITED STATES PATENTS

| | | |
|---|---|---|
| 1,709,377 | Sperry | Apr. 16, 1929 |
| 2,235,804 | Macalpine | Mar. 18, 1941 |
| 2,325,258 | Mallory | July 27, 1943 |
| 2,332,383 | Kost | Oct. 19, 1943 |
| 2,480,624 | Barnard et al. | Aug. 30, 1949 |
| 2,514,889 | McGoffin | July 11, 1950 |
| 2,589,130 | Potter | Mar. 11, 1952 |
| 2,678,411 | Hufnagel | May 11, 1954 |
| 2,753,494 | McLellan | July 3, 1956 |
| 2,955,279 | Bode | Oct. 4, 1960 |